United States Patent
Au et al.

(10) Patent No.: US 11,659,563 B2
(45) Date of Patent: May 23, 2023

(54) SYSTEM AND METHOD FOR USER EQUIPMENT IDENTIFIER CONFIGURATION

(71) Applicants: Kelvin Kar Kin Au, Kanata (CA); Mohammadhadi Baligh, Ottawa (CA)

(72) Inventors: Kelvin Kar Kin Au, Kanata (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/848,725

(22) Filed: Dec. 20, 2017

(65) Prior Publication Data

US 2018/0192401 A1  Jul. 5, 2018

Related U.S. Application Data (60) Provisional application No. 62/442,198, filed on Jan. 4, 2017.

(51) Int. Cl.
*H04W 72/23* (2023.01)
*H04L 5/00* (2006.01)
(Continued)

(52) U.S. Cl.
CPC ............ *H04W 72/23* (2023.01); *H04L 5/001* (2013.01); *H04L 5/0091* (2013.01); *H04W 52/0229* (2013.01); *H04W 72/0453* (2013.01); *H04W 76/11* (2018.02); *H04W 76/27* (2018.02); *H04L 5/0053* (2013.01); *H04W 8/26* (2013.01); *H04W 52/0235* (2013.01)

(58) Field of Classification Search
CPC ... H04W 72/042; H04W 76/11; H04W 76/27; H04W 72/1289; H04W 72/0453; H04W 8/26; H04L 5/0091; H04L 5/001; H04L 5/0053
See application file for complete search history.

(56) References Cited

U.S. PATENT DOCUMENTS

| 9,094,809 B2 * | 7/2015 | Lindoff | H04W 88/06 |
| 2002/0115470 A1 * | 8/2002 | D'herbemont | H04W 8/26 455/551 |

(Continued)

FOREIGN PATENT DOCUMENTS

| CN | 101616493 A | 12/2009 |
| CN | 101785218 A | 7/2010 |

(Continued)

OTHER PUBLICATIONS

3GPP TSG-RAN WG1 meeting #46bis R1-062838,"Short UE ID for DL L1/L2 control signaling", Nokia,Oct. 9-13, 2006,total 3 pages.
(Continued)

*Primary Examiner* — Ajit Patel
*Assistant Examiner* — Wilfred Thomas (57) ABSTRACT

Systems and methods are provided for configuring a bit length of a user equipment identifier (UE ID) used for communications in Layer 1 or Layer 2, or both, between a UE and a network. Multiple mechanisms are provided for the network to provide identifier parameter information (for example bit length and/or an identifier value or a range of values) to the UE to allow the UE to select a particular UE ID based on the identifier parameter information.

20 Claims, 7 Drawing Sheets

(51) Int. Cl.
*H04W 72/0453* (2023.01)
*H04W 52/02* (2009.01)
*H04W 76/11* (2018.01)
*H04W 76/27* (2018.01)
*H04W 8/26* (2009.01)

(56) References Cited

U.S. PATENT DOCUMENTS

| | | | | |
|---|---|---|---|---|
| 2005/0141471 | A1* | 6/2005 | Virtanen | H04L 47/2416 370/342 |
| 2007/0226502 | A1* | 9/2007 | Tenny | H04L 9/0891 713/170 |
| 2007/0259675 | A1* | 11/2007 | Worrall | H04W 68/00 455/458 |
| 2008/0194235 | A1* | 8/2008 | Dalsgaard | H04J 11/0086 455/411 |
| 2009/0010219 | A1* | 1/2009 | Lee | H04B 17/24 370/329 |
| 2010/0062795 | A1 | 3/2010 | Lee | |
| 2010/0215013 | A1* | 8/2010 | Chun | H04W 74/002 370/329 |
| 2010/0304771 | A1 | 12/2010 | Dottling et al. | |
| 2011/0086608 | A1* | 4/2011 | Yamagishi | H04W 48/12 455/404.1 |
| 2011/0098053 | A1* | 4/2011 | Widegren | H04W 72/042 455/450 |
| 2012/0207070 | A1* | 8/2012 | Xu | H04W 52/0225 370/311 |
| 2012/0243417 | A1* | 9/2012 | Henttonen | H04W 76/27 370/241 |
| 2012/0276913 | A1* | 11/2012 | Lim | H04W 76/12 455/450 |
| 2012/0302230 | A1* | 11/2012 | Lim | H04W 8/065 455/422.1 |
| 2013/0010768 | A1* | 1/2013 | Lee | H04W 76/27 370/336 |
| 2013/0136048 | A1* | 5/2013 | Cho | H04W 72/042 370/311 |
| 2013/0155981 | A1* | 6/2013 | Kitazoe | H04W 8/26 370/329 |
| 2013/0182586 | A1* | 7/2013 | Paladugu | H04W 76/27 370/252 |
| 2013/0215834 | A1* | 8/2013 | Deivasigamani | H04W 76/27 370/329 |
| 2013/0279385 | A1* | 10/2013 | Meylan | H04W 76/27 370/311 |
| 2014/0004842 | A1* | 1/2014 | Lindoff | H04W 8/183 455/418 |
| 2014/0293857 | A1 | 10/2014 | Dalsgaard et al. | |
| 2014/0315593 | A1* | 10/2014 | Vrzic | H04W 52/228 455/522 |
| 2015/0003311 | A1* | 1/2015 | Feuersaenger | H04W 72/042 370/311 |
| 2015/0043455 | A1* | 2/2015 | Miklos | H04W 76/11 370/329 |
| 2016/0007406 | A1* | 1/2016 | Yi | H04W 24/02 370/252 |
| 2016/0037495 | A1 | 2/2016 | Zhou | |
| 2016/0044605 | A1 | 2/2016 | Vajapeyam et al. | |
| 2017/0055301 | A1* | 2/2017 | Choi | H04W 76/11 |
| 2017/0150529 | A1* | 5/2017 | Tan | H04W 24/08 |
| 2019/0191483 | A1* | 6/2019 | Ryoo | H04W 52/0229 |
| 2020/0068606 | A1* | 2/2020 | Zhang | H04L 69/324 |
| 2020/0322854 | A1* | 10/2020 | Ryoo | H04W 36/0085 |

FOREIGN PATENT DOCUMENTS

| | | | |
|---|---|---|---|
| CN | 102088793 | A | 6/2011 |
| CN | 103563446 | A | 2/2014 |
| CN | 103843448 | A | 6/2014 |
| EP | 2747508 | A1 | 6/2014 |
| JP | 2010506504 | A | 2/2010 |
| JP | 2012124602 | A | 6/2012 |
| RU | 2491794 | C1 | 8/2013 |
| WO | 2014181440 | A1 | 11/2014 |
| WO | 2016008538 | A1 | 1/2016 |
| WO | 2016177175 | A1 | 11/2016 |

OTHER PUBLICATIONS

Nokia et al., "Basic grant-free transmission procedure for URLLC",3GPP TSG-RAN WG1 #87,R1-1612250,Reno, USA, Nov. 14-18, 2016, total 4 pages.

* cited by examiner

SYSTEM AND METHOD FOR USER EQUIPMENT IDENTIFIER CONFIGURATION

RELATED APPLICATIONS

This application claims priority to U.S. Provisional Application No. 62/442,198 filed on Jan. 4, 2017, which is incorporated herein by reference in its entirety.

FIELD

The present disclosure relates generally to techniques for configuring a user equipment identifier.

BACKGROUND

The bit length defining a user equipment (UE) identifier (ID) for Layer 1 (L1) or Layer 2 (L2), or both (L1/L2) in a radio access network (RAN) is fixed for all users. In Long Term Evolution (LTE) networks, a radio network temporary identifier (RNTI) is used to identify UEs connected to the network. For example, RNTI, a L1/L2 identifier, is 16 bits in LTE.

The RNTI may also be used to filter received Physical Downlink Control Channel (PDCCH) commands in a UE search space and enable a UE to discard messages that are not targeted to the UE, but are targeted to other UEs. The RNTI may also be used as a UE-specific seed for randomizers and scramblers. The RNTI may also be used for applications such as, but not limited to, paging, power control and providing system information.

SUMMARY

According to an aspect of the application there is provided a method that involves configuring a length of a first user equipment (UE) identifier (ID) for use in at least one of Layer 1 and Layer 2 (L1/L2) communications between a network and a UE.

In some embodiments, configuring the length of the first UE ID involves the UE receiving identifier parameter information for use in defining the length of the first UE ID.

In some embodiments, the identifier parameter information involves at least one of a UE ID bit length and a value to be used for the first UE ID.

In some embodiments, the method further involves the UE sending a message to the network to request uplink resources.

In some embodiments, the method further involves, prior to the UE receiving identifier parameter information, the UE sending a message to the network in order to request the first UE ID.

In some embodiments, the message is part of a random access channel (RACH) preamble.

In some embodiments, the UE receiving parameter information involves the UE receiving a Random Access Response (RAR).

In some embodiments, the method further involves the UE sending a request for a second UE ID.

In some embodiments, the method further involves receiving the second UE ID.

In some embodiments, the method further involves maintaining both the first UE ID and the second UE ID or dropping the first UE ID and using the second UE ID.

In some embodiments, configuring the length of the first UE ID involves the network broadcasting identifier parameter information for use in defining the length of the first UE ID.

In some embodiments, the identifier parameter information involves at least one of: a bit length and a value to be used as the first UE ID.

In some embodiments, the method further involves the network receiving a message from the UE requesting the first UE ID.

In some embodiments, the method further involves determining a bit length and value or range of values to be sent as the identifier parameter information based on the message.

In some embodiments, determining a bit length and value or range of values to be sent is based upon a time-frequency resource of the message.

In some embodiments, the message is part of a random access channel (RACH) preamble.

In some embodiments, the network broadcasting identifier parameter information involves the network transmitting a Random Access Response (RAR).

In some embodiments, the method further involves the network receiving a request for a second UE ID.

In some embodiments, the method further involves transmitting the second UE ID.

According to an aspect of the application there is provided a method involving: when a UE is in an active state, using a first UE ID; and when the UE is in an inactive state, using a second UE ID.

In some embodiments, the first UE ID has a shorter bit length than the second UE ID.

According to an aspect of the application there is provided an apparatus including a processor and a processor-readable storage media. The processor-readable storage media comprises processor executable instructions, that when executed, perform a method involving configuring a length of a first user equipment (UE) identifier (ID) for use in at least one of Layer 1 and Layer 2 (L1/L2) communications between a network and a UE.

In some embodiments, the apparatus is a user equipment (UE).

In some embodiments, the processor executable instructions are configured to control the UE receiving identifier parameter information for use in defining the length of the first UE ID.

In some embodiments, the processor executable instructions are configured to control the UE sending a message to the network to request uplink resources.

In some embodiments, the processor executable instructions are configured to control the UE sending a message to the network in order to request the first UE ID.

In some embodiments, the processor executable instructions are configured to control the UE sending a request for a second UE ID.

In some embodiments, the processor executable instructions are configured to control the UE receiving the second UE ID.

In some embodiments, the apparatus is a network controller.

In some embodiments, the processor executable instructions are configured to control the network controller broadcasting identifier parameter information for use in defining the length of the first UE ID.

In some embodiments, the processor executable instructions are configured to control the network controller receiving a message from the UE requesting the first UE ID.

In some embodiments, the processor executable instructions are configured to control the network controller determining a bit length and value or range of values to be sent as the identifier parameter information based on the message.

In some embodiments, the processor executable instructions are configured to control the network controller receiving a request for a second UE ID.

In some embodiments, the processor executable instructions are configured to control the network controller transmitting the second UE ID.

According to an aspect of the application there is provided a method involving: receiving, by a user equipment (UE), a first UE identifier (ID) for use when the UE is in an active state; receiving, by the UE, a second UE ID for use when the UE is in an inactive state; and transitioning, by the UE, from the active state to the inactive state.

In some embodiments, the method further involves maintaining the second UE ID after transitioning from the active state to the inactive state.

In some embodiments, the method further involves dropping the first UE ID and using the second UE ID.

In some embodiments, using the second UE ID involves using the second UE ID for uplink based measurements or grant free communications.

In some embodiments, the first UE ID has a shorter bit length than the second UE ID.

In some embodiments, receiving identifier parameter information defining the length of the first UE ID or the second UE ID.

In some embodiments, the identifier parameter information involves at least one of: a bit length; an index value associated with a selected UE ID bit length; and a value to be used as the first UE ID or the second UE ID.

In some embodiments, the method further involves transmitting a message from the UE requesting the first UE ID or the second UE ID.

According to an aspect of the application there is provided a user equipment (UE) including: a receiver; a transmitter; and a processor operatively connected to the receiver and the transmitter. The processor is configured to: receive a first UE identifier (ID) for use when the UE is in an active state; receive a second UE ID for use when the UE is in an inactive state; and transition the UE from the active state to the inactive state.

In some embodiments, the processor is further configured to maintain the second UE ID after transitioning from the active state to the inactive state.

In some embodiments, the processor is further configured to drop the first UE ID and using the second UE ID.

In some embodiments, using the second UE ID involves using the second UE ID for uplink based measurements or grant free communications.

In some embodiments, the first UE ID has a shorter bit length than the second UE ID.

In some embodiments, the processor is further configured to receive identifier parameter information defining the length of the first UE ID or the second UE ID.

In some embodiments, the identifier parameter information involves at least one of: a bit length; an index value associated with a selected UE ID bit length; and a value to be used as the first UE ID or the second UE ID.

In some embodiments the processor is further configured to transmit a message requesting the first UE ID or the second UE ID.

According to an aspect of the application there is provided a method involving: transmitting, by a base station, a first user equipment (UE) identifier (ID) to a UE, for use when the UE is in an active state; transmitting, by the base station, a second UE ID to the UE, for use when the UE is in an inactive state; and using the second UE ID when the UE is in the inactive state.

In some embodiments, using the second UE ID involves using the second UE ID for uplink based measurements or grant free communications.

According to an aspect of the application there is provided a base station including a receiver; a transmitter; and a processor operatively connected to the receiver and the transmitter. The processor is configured to transmit a first user equipment (UE) identifier (ID) to a UE, for use when the UE is in an active state; transmit a second UE ID to the UE, for use when the UE is in an inactive state; and use the second UE ID when the UE is in the inactive state.

In some embodiments, the processor using the second UE ID involves the processor using the second UE ID for uplink based measurements or grant free communications.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Figure 1:
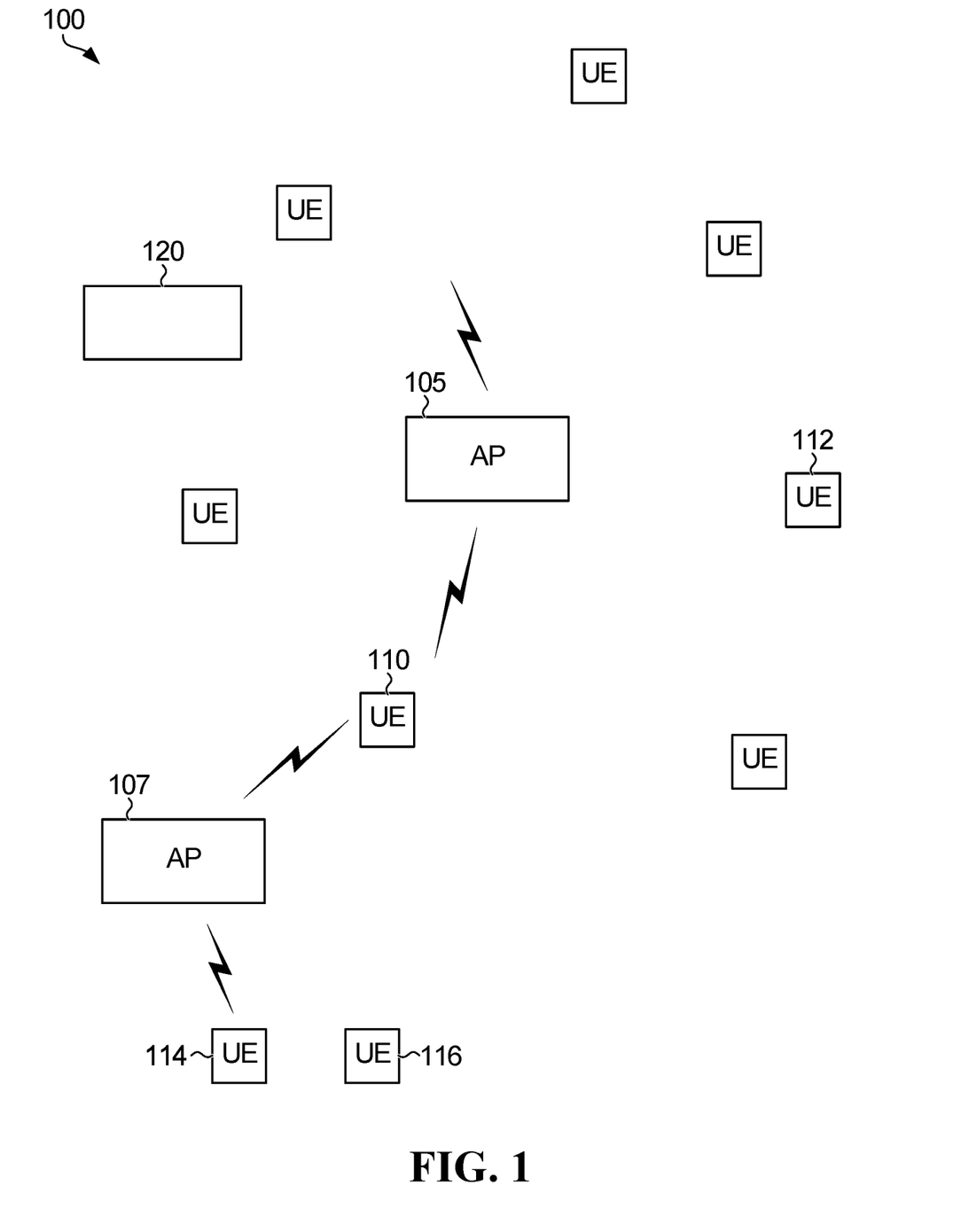
FIG. 1 illustrates an example communications system having communication nodes that may operate according to example embodiments described herein.

FIG. 1 illustrates an example communications network 100. Communications network 100 includes two access points (APs) 105 and 107, which serve a plurality of user equipments (UEs), such as UE 110, 112, 114 and 116. An AP may also be referred to as a base station, an evolved NodeB (eNodeB or eNB), a transmit point (TP), a receive point (RP), a transmit and receive point (TRP), and the like. A UE may also be referred to as a mobile device, a mobile station, a terminal, and the like. In general, an AP may have multiple transmit antennas, allowing it to transmit to multiple UEs, to transmit multiple layers to a single UE, or a combination thereof. Furthermore, a first AP 105 may transmit to a UE 110 that is also receiving a transmission from a second AP 107. In the implementation of FIG. 1, a network server 120 is responsible for generating communications from the network. Network server 120 is communicatively coupled to the APs 105 and 107 (not shown), which transmit and receive signals from the UEs.

Although it is understood that communications systems may employ multiple APs capable of communicating with a number of UEs, only two APs, and nine UEs are illustrated for simplicity.

The UEs 110, 112, 114 and 116 each utilize at least one UE ID in their communication with the network. Different layers in the network may utilize different UE IDs that are particular to a given use. As a result, the UE IDs of different layers may be of a different fixed size in each layer. For example, in LTE, the radio network temporary identifier (RNTI) has a bit length of 16 bits, and a Serving Temporary Mobile Subscriber Identity (S-TMSI) has a bit length of 40 bits. A benefit of using a fixed bit length UE ID is that it allows for a simplified design for different messages in different layers.

However, using a fixed length UE ID can be a drawback because the fixed length UE ID can limit forward compatibility and incur a fixed amount of overhead, even if it is not needed. For example, if the fixed bit length is selected to accommodate a maximum number of UEs, i.e. 4 bits allows for the identification of 16 UEs, and then when the number of active UEs is less than the maximum number of UEs, there may be more overhead than necessary. In the example with 4 bits, if there are only 7 UEs currently active in the system, only 2 bits of the 4 bits are needed, and therefore 2 bits are wasted overhead at that time.

Such a technique may also result in an inability to differentiate the identification process for different UEs, for different traffic types and for different slices. In 5G telecommunication systems, it is envisioned that a UE could have an array of antennas, and a wireless network with which the UE communicates could be arranged, into a number of logical networks, each having distinct characteristics. For example, one logical network (also referred to as a network slice) might have characteristics including low bandwidth, long range reception between a base station (or access point) and the UE, and support high speed of movement of the UE with respect to the base station, while another logical network might have characteristics including high bandwidth, low range reception between the base station and the UE, and support a low speed of movement of the UE with respect to the base station. This technique may result in a lost opportunity to optimize the complexity or the overhead, or both, when there is mixed traffic or multiple slices in the RAN.

In New Radio (NR), it is expected that the length of the UE ID will be increased for some usage scenarios such as for massive machine type communications (mMTC), but remain fixed in length. However, a fixed size UE ID, even if it is greater than 16 bits, may not be appropriate for all situations. For example, a larger-than 16 bit fixed size UE ID may introduce additional complexity or overhead, or both, that is not always needed. Such a fixed length UE ID may also limit forward compatibility.

Aspects of the present application introduce methods and systems that allow a network to configure the bit length of the UE ID used in the RAN for different usage scenarios, as opposed to having a fixed bit length UE ID for all usage scenarios.

According to an aspect of the application, the network, via an AP, signals information regarding parameters associated with the identifier to the UE. Two non-limiting examples of such identifier parameter information may include the bit length (e.g. 16 bits, 20 bits, etc.) and a value defining the UE identity from a range of potential identities. Table 1 below illustrates an example of identity values (in hexadecimal) and associated identities. The range 1 to range 2 values define a starting point and an ending point of a range for particular set of identifier types, i.e. RA-RNTI (Random Access-RNTI), C-RNTI (Cell-RNTI), Semi-Persistent Scheduling C-RNTI, Temporary C-RNTI, TPC-PUCCH-RNTI (Transmit Power Control-Physical Uplink Control Channel-RNTI) and TPC-PUSCH-RNTI (Transmit Power Control-Physical Uplink Shared Channel-RNTI). The range2+1 to range 3 values define a starting point and an ending point of a range for a different set of identifier types, i.e. C-RNTI, Semi-Persistent Scheduling C-RNTI, Temporary C-RNTI, TPC-PUCCH-RNTI and TPC-PUSCH-RNTI. In some implementations, there may be sub-ranges within each range designated for each of the particular identifier types.

TABLE 1

| Value (hexa-decimal) | Identifier |
| --- | --- |
| 0000 . . . 0 | N/A |
| [range1 . . . range2] | RA-RNTI, C-RNTI, Semi-Persistent Scheduling C-RNTI, Temporary C-RNTI, TPC-PUCCH-RNTI and TPC-PUSCH-RNTI |
| [range2 + 1 . . . range3] | C-RNTI, Semi-Persistent Scheduling C-RNTI, Temporary C-RNTI, TPC-PUCCH-RNTI and TPC-PUSCH-RNTI |
| [range3 + 1 . . . range4] | Reserved for future use |
| Value1 | M-RNTI |
| Value 2 | P-RNTI |
| Value 3 | SI-RNTI |

RNTIs may be used to differentiate or identify, or both, a connected mode UE in the cell, a specific radio channel, a group of UEs that are subject to paging as a group, a group of UEs that are subject to power control as a group and system information transmitted for all the UEs by the AP. Connected mode is a state, for example in LTE, where a Radio Resource Control (RRC) connection is established. It often means that a UE actively monitors a control channel and is transmitting and/or receiving or a transmission and/or reception of information is imminent.

There are multiple RNTI types in LTE. Each RNTI has a particular usage and a range of values. Below is a description of several different types of RNTI listed in Table 1 above.

RA-RNTI (Random Access RNTI)

As part of a Random Access procedure, the AP's network controller, which in some implementations may include a Media Access Control (MAC) controller, generates a Random Access Response (RAR) as a response to a Random Access Preamble transmitted by the UE. RAR is transmitted on a Downlink Shared Channel (DL-SCH) transport channel which in turn may be mapped to a Physical Downlink Shared Channel (PDSCH). The AP scrambles a Physical Downlink Control Channel's (PDCCH's) Cyclic Redundancy Check (CRC) with a RA-RNTI for transmission of PDSCH that carries the RAR(s). The RA-RNTI may be addressed to multiple UEs, i.e., multiple UEs might decode the PDCCH scrambled by the same RA-RNTI. The RA-RNTI unambiguously identifies which time-frequency resource was utilized by the UE to transmit the Random Access Preamble. The values corresponding to the RA-RNTI values of a cell's Physical Random Access Channel (PRACH) configuration are not used in the cell for any other RNTI (C-RNTI, Semi-Persistent Scheduling C-RNTI, Temporary C-RNTI, TPC-PUCCH-RNTI or TPC-PUSCH-RNTI).

SPS C-RNTI (Semi-Persistent Scheduling C-RNTI)

SPS C-RNTI identifies semi-persistent grants or assignments of transmission resources. SPS C-RNTI is a dedicated RNTI and is configured by Radio Resource Control (RRC) signaling. The AP may configure the UE with a SPS C-RNTI.

TPC RNTI (Transmit Power Control RNTI)

TPC RNTI is used in relation to uplink power control. There are two types, TPC-PUSCH-RNTI and TPC-PUCCH-RNTI. Normally, TPC RNTI is assigned to a group of UEs. The AP may configure the UE with TPC-PUSCH-RNTI and TPC-PUCCH-RNTI via RRC signalling.

C-RNTI (Cell RNTI)

C-RNTI is a unique identification used for identifying RRC Connection and scheduling that is dedicated to a particular UE while the UE is within a given cell. The AP may assign different C-RNTI values to different UEs. The AP uses C-RNTI to allocate uplink grants, downlink assignments, PDCCH orders, etc. to a UE. In other words, the AP uses C-RNTI when performing functions such as but not limited to, allocating uplink grants for transmission resources, allocating downlink assignments for transmission resources, and PDCCH configuration of a UE. The AP may also use C-RNTI to differentiate uplink transmissions (e.g. PUSCH, PUCCH) of a UE from other UEs.

Temporary C-RNTI

As part of a Random Access (RA) procedure, the AP's MAC generates a Random Access Response (RAR) as a response to the Random Access Preamble transmitted by the UE. The MAC RAR contains a Temporary C-RNTI.

During a contention based random access procedure, the UE may store a received Temporary C-RNTI (received in RAR) and use it during the contention based random access procedure. The UE may discard the Temporary C-RNTI value received in RAR during non-contention based random access procedure. The UE may use the Temporary C-RNTI for scrambling of a msg3 type message i.e. PUSCH corresponding to RAR grant, and retransmissions.

During a contention based RA procedure, the UE may monitor the PDCCH that is scrambled with the Temporary C-RNTI. The Temporary C-RNTI is promoted to C-RNTI for a UE which detects Random Access success and does not already have a C-RNTI. The Temporary C-RNTI is dropped by other UEs (for which contention is not successful). A UE which detects RA success and already has a C-RNTI, may resume using its C-RNTI and discard the Temporary C-RNTI.

M-RNTI (Multimedia Broadcast Multicast Service (MBMS)-RNTI)

Indication of an MBMS specific RNTI, the M-RNTI, on PDCCH is used to inform UEs in idle or connected states about a Multicast Control Channel (MCCH) information change.

P-RNTI (Paging RNTI)

P-RNTI is used by the UEs for the reception of paging messages. The P-RNTI is a common value that is used for all UEs when necessary. A paging message is typically carried by a Paging Control Channel (PCCH) logical channel, which is mapped to a Paging Channel (PCH) transport channel. The PCH transport channel is mapped to a PDSCH physical channel. The AP may scramble PDCCH's CRC with P-RNTI for transmission of PDSCH that carries paging information.

SI-RNTI (System Information-RNTI)

SI-RNTI is used in relation to broadcast of system information. The SI-RNTI is a common value that is used for all UEs when necessary. Broadcast of System Information uses a Broadcast Control Channel (BCCH) logical channel which is then mapped to a DL-SCH transport channel which in turn is mapped to a PDSCH physical channel. The UEs should know the scheduling information for PDSCH which is carrying System Information. The required scheduling information is contained in Downlink Control Information (DCI) whose CRC is scrambled by SI-RNTI.

A controller component of the network, which may in some embodiments be a MAC controller, broadcasts the identifier parameter information via the AP. For example, the identifier parameter information may be broadcast by the network on a periodic basis to provide UEs with a UE ID value, or a small range of values, for common RNTI information, such as RA-RNTI, M-RNTI, P-RNTI or SI-RNTI. In some embodiments, the network updates the length of UE ID. In some embodiments, the network may also broadcast other parameter information when the network updates the length of UE ID.

The network may maintain a set of the identifier parameter information or multiple sets of identifier parameter information, and broadcast updated information to the UEs periodically or as needed. In some implementations of when the network maintains multiple sets of identifier parameter information, each set includes UE ID values for different UE ID bit lengths. The UE may be made aware of the multiple sets of identifier parameter information so that if the network sends an index value to identify identifier parameter information, the UE is capable of determining which set of identifier parameter information the index value is associated with. For example, a first set has UE ID values for UE ID bit lengths of 16 bits, a second set has UE ID values for UE ID bit lengths of 24 bits and third set has UE ID values for UE ID bit lengths of 32 bits, allowing the network to send appropriate information to different UEs.

In some embodiments, when there is only a single set of identifier parameter information maintained by the network for a particular UE ID bit length, the network may broadcast only the UE ID bit length as identifier parameter information. Alternatively, in some embodiments the network may broadcast an index value associated with a selected UE ID bit length. The index value may be one or more bits, depending on the number of possible UE ID bit lengths. A UE can use the received index value to determine the selected UE ID bit length to determine the bit length of the UE ID that the UE will be assigned. In other embodiments, when the network maintains more than one set per UE ID bit length, the network may broadcast the UE ID bit length and also an identifier for the appropriate set.

In some embodiments, the sets of data may be representative of data found in a table such as Table 1.

In some embodiments, the UE ID value may be deduced by the UE based on a formula known by the UE or transmitted to the UE by the network, using additional parameter information broadcast by the network. For example, the network may broadcast a bit length of a UE ID to be used by the UE, and based on the formula the UE can deduce the UE ID value. Such an implementation may be more typically used for determining the UE IDs for the common UE ID values, such as RA-RNTI, M-RNTI, P-RNTI or SI-RNTI. However, using such an implementation for other UE specific UE ID values is also contemplated.

There are multiple mechanisms by which the parameter information may be communicated. A first mechanism includes communicating the parameter information via system information. A second mechanism includes communicating the parameter information via a random access procedure (e.g. 4-step or 2-step RACH procedures). A third mechanism includes communicating the parameter information via a higher layer signaling such as RRC signaling. Additional detail of the three mechanisms will be provided below.

According to aspects of the application, the network may configure the UE ID length based on conditions such as, but not limited to, usage scenarios, a network slice that is being used (e.g. mMTC, eMBB, URLLC) and a number of UEs in the system. System information The network may broadcast parameter information as part of the system information that is broadcast by the network at regular intervals. When the UE first attempts to access the network the UE obtains parameter information that enables the UE to generate a UE ID of appropriate length. The UE ID generated by the UE may be an RA-RNTI identifier that, at least temporarily, is used by the UE. The UE could then later request a different UE ID appropriate to a different slice.

Random Access Procedure

Figure 2:
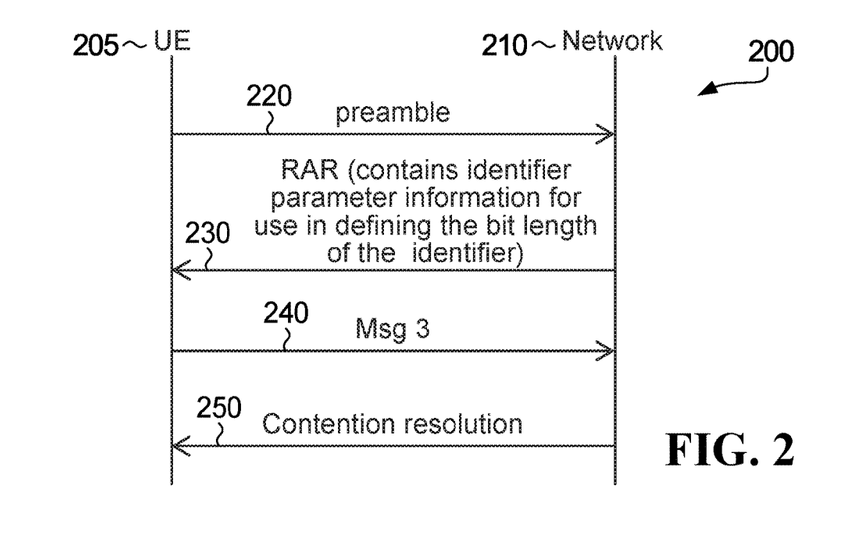
FIG. 2 is a signaling diagram illustrating an example of how a UE ID may be configured according to an aspect of the application.

FIG. 2 is a signaling diagram 200 that shows how the identifier parameter information that is used to define the bit length of UE ID may be communicated via signaling between the UE and the network. In FIG. 2, UE 205 communicates with network 210. UE 205 transmits 220 a random access channel (RACH) preamble to network 210. In response to the RACH preamble from the UE, network 210 transmits 230 a random access response (RAR) to UE 205 that includes identifier parameter information. UE 205 then transmits 240 a message (Msg3) to network 210 that includes a RRC Connection Request as part of an uplink grant request. If necessary, contention resolution 250 occurs between multiple UEs, including UE 205, and network 210.

Figure 3:
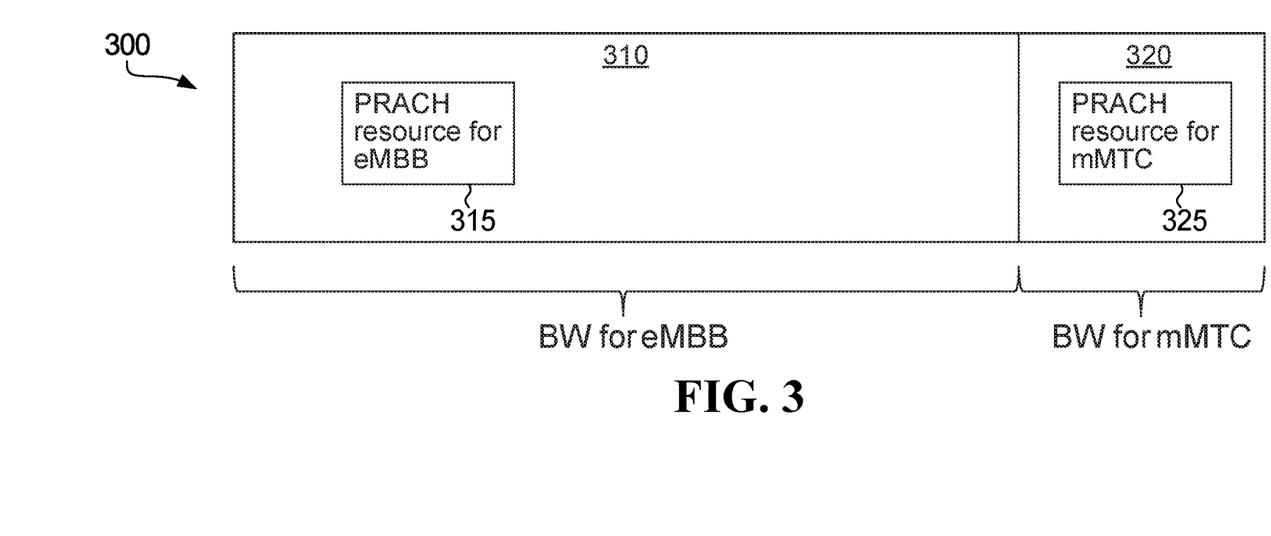
FIG. 3 is a block diagram illustrating a time frequency resource used for a preamble of a Random Access Channel (RACH) according to an aspect of the application.

Such a process may be used in cases where the network can implicitly derive the UE's slice information. For example, this may occur when the RACH preamble is sent in a time-frequency resource associated with a particular slice. FIG. 3 illustrates an example of a RACH preamble 300. In the RACH preamble 300, a first time-frequency resource 310 is associated with an enhanced mobile broadband (eMBB) slice and a second time-frequency resource 320 is associated with a massive machine type communication (mMTC) slice. When the network detects the RACH preamble (PRACH) 315 in the first time-frequency resource 310, the network can assign a UE ID having a bit length of an appropriate size. Likewise, when the network detects the PRACH 325 in the second time-frequency resource 320, the network can assign a UE ID having a bit length of an appropriate size.

In some embodiments, the range of RA-RNTI values may be divided between two or more different slices. Although the same preamble RACH area is used for the different slices, a subset of the range of RA-RNTI values is associated with a particular slice, and another subset of the range of RA-RNTI values may be used for other purposes and slices.

In some embodiments, different UEs may use different UE identification mechanisms in different traffic types and in different slices. A UE may receive multiple identifiers for use with different respective slices. The identifiers may have different lengths.

RRC Configuration

In some implementations, when the UE accesses the network, the UE provides directly, or indirectly, information regarding the UE's capability to the network. Examples of the UE capability may include, but are not limited to, a maximum number of layers, a maximum data rate, support for certain procedures and receivers, such as successive interference cancellation (SIC). The network then provides the UE the identifier parameter information such as, but not limited to, the UE ID bit length and value ranges of the identities.

In some situations the UE may access the network using a default UE identification process that has a fixed length UE ID. For example, the UE may enter the network based on using a UE ID for eMBB. If the UE wants to utilize a different slice, the UE can request to be transferred to the different slice, such as mMTC, which may have a different identification process.

Figure 4:
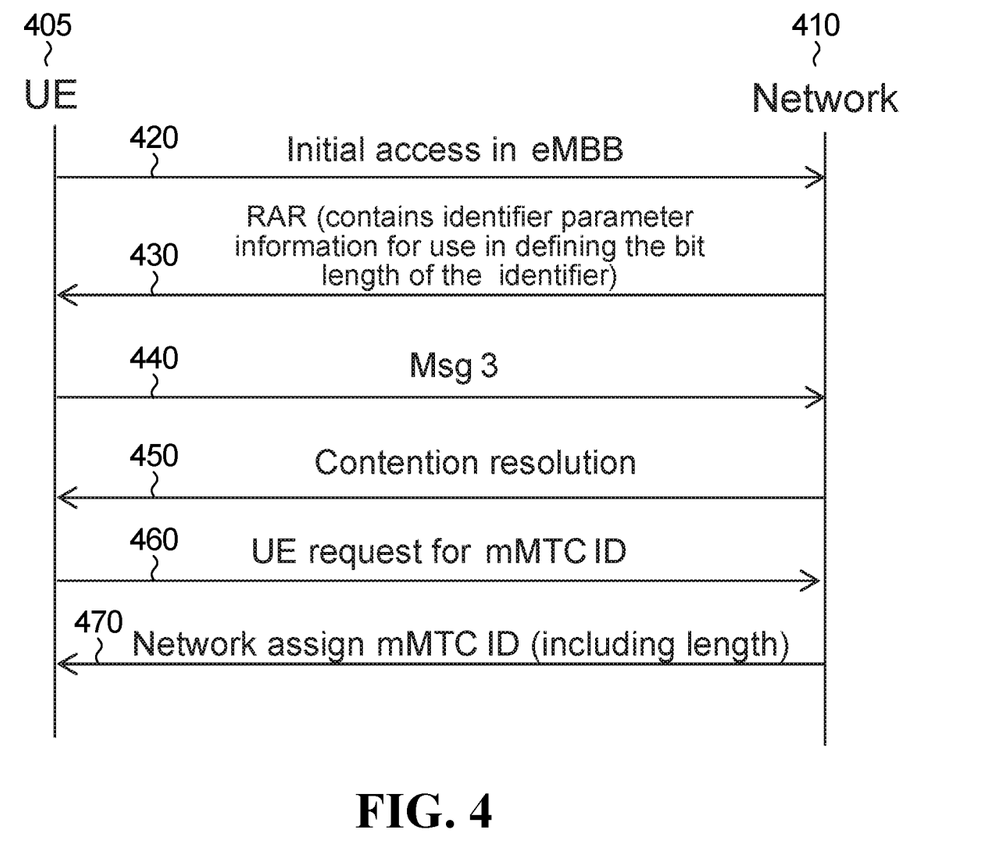
FIG. 4 is a signaling diagram illustrating another example of how a UE ID may be configured according to an aspect of the application.

FIG. 4 is a signaling diagram 400 that shows how the identifier parameter information that is used to define bit length of the UE ID may be communicated when the UE is first entering the network under a default identification process and subsequently requesting, and being granted, a UE ID of a different bit length for an alternative slice.

In FIG. 4, UE 405 communicates with network 410. UE 405 transmits 420 a RACH preamble to a controller in the network 410 to obtain an eMBB identifier. In response to the RACH preamble, network 410 transmits 430 a RAR to UE 405 that includes the identifier parameter information for the eMBB identifier. UE 405 then transmits 440 a message (Msg3) to network 410. The message, for example, may be to identify the UE ID that UE 405 has selected, or to identify the UE 405 itself (e.g. by temporary mobile subscriber identity (TMSI)). If necessary, contention resolution 450 occurs between multiple UEs, including UE 405, and network 410. At some later time, UE 405 transmits 460 a request for a different UE ID. In the example of FIG. 4, the different UE ID is an mMTC identifier. In response to the request, network 410 transmits 470 a message assigning an mMTC identifier for UE 405. After UE 405 is assigned the new identifier, in this case for mMTC, UE 405 may either maintain the eMBB identifier in parallel with the mMTC identifier or drop the eMBB identifier.

Although eMBB and mMTC are the two examples described above, it is understood that either of these two examples could be alternative network slices to those described that have different respective identifiers based on the operation of the network involved.

Having a UE ID that can be varied in length may have an impact on the control channel. In some embodiments, a PDCCH message length may change based on UE ID length. Changing the message length of the PDCCH may allow extra bits to be used for indicating different search spaces for different traffic or slices, or both using different ID length. The fact that the PDCCH message length can be changed may allow overhead to be optimized as compared to if the PDCCH message length is not changed.

Alternatively, the PDCCH message length may remain constant for different UE ID lengths. As described above, the extra bits may be used for indicating different search spaces for different types of traffic or slices, or both. However, in such a scenario, if the bit length of the UE ID is reduced by an amount that is more than the amount that the PDCCH message length is reduced, there may be additional overhead in the PDCCH that is not being effectively utilized.

In some aspects of the application, it may be possible to allocate to a UE more than one set of identifiers. For example, it may be possible to allocate to a UE an active identifier when the UE is active. Because there are usually fewer active UEs than non-active UEs at any given time, the size of the UE ID for the active UEs can be a smaller number of bits. The UE ID may expire when the UE becomes inactive or idle, at which time the UE can use an alternative inactive ID. As indicated above, because there are often more inactive UEs than active UEs, the inactive UE IDs will often have a longer bit length.

The inactive UE ID may remain valid when the UE transitions from inactive to active and back. The UE can maintain the inactive UE ID until the UE ID is intentionally reconfigured.

The inactive UE ID may be used for functionality such as, but not limited to, uplink based measurements and grant free communications when in an inactive mode. Active UEs may use the inactive UE ID while performing the same activity sets as inactive UEs, such as grant free communication.

Figure 5:
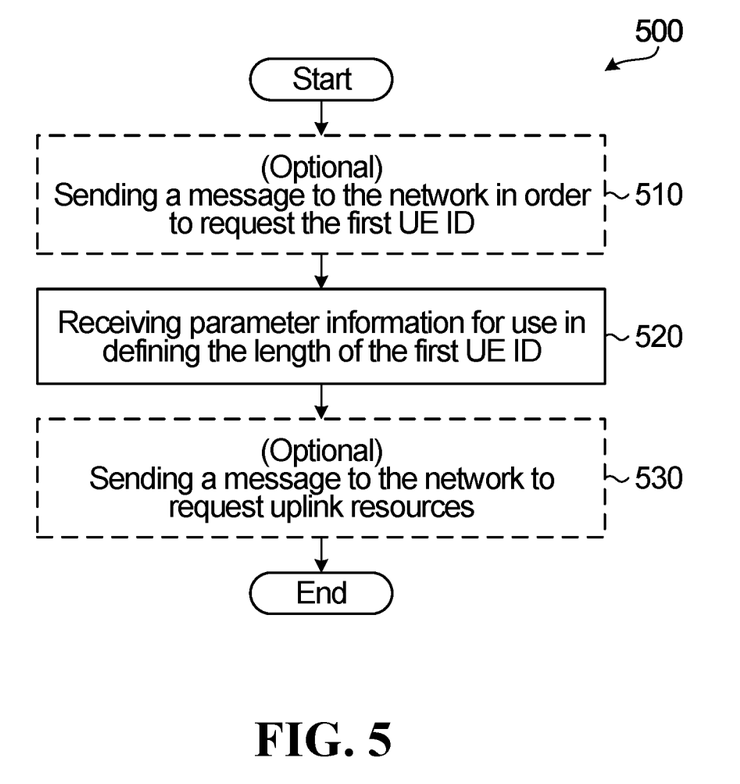
FIG. 5 is a flow diagram of an example method according to an embodiment of the application.

FIG. 5 includes a flowchart 500 that illustrates an example method for configuring a UE ID from the perspective of the UE.

Step 510, which is optional, involves the UE sending a message to the network in order to request a first UE ID. The step can be considered to be optional as it is possible that the network could send identifier parameter information to the UE without a request from the UE. This step may be performed in the Random Access Procedure and the RRC Configures mechanisms described above. Step 520 involves the UE receiving parameter information for use in defining the length of the first UE ID. In a further optional step, step 530 involves the UE sending a message to the network to request uplink resources.

Figure 6:
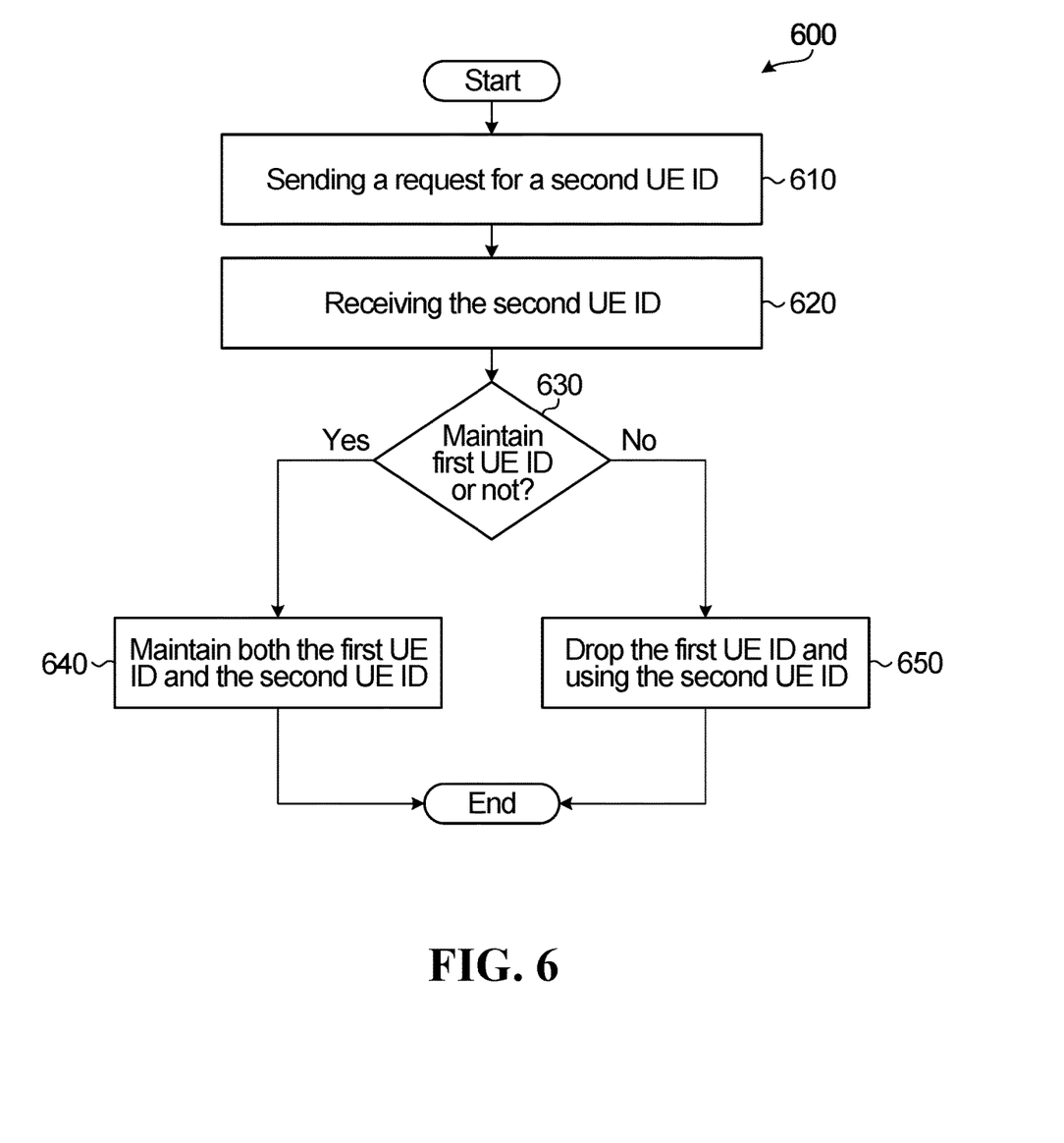
FIG. 6 is a flow diagram of an example method according to another embodiment of the application.

FIG. 6 includes a flowchart 600 that illustrates additional steps that may be performed following step 540 of FIG. 5. Such steps may generally correspond to steps described above that are part of the RRC Configuration mechanism. Step 610 involves the UE sending a request for a second UE ID. The second UE ID may be for a different slice being used by the UE. In some embodiments, the second UE ID may be for use when the UE is in an inactive state, if the first UE ID is for use when the UE is in an active state, or vice versa. At step 620, the UE receives the second UE ID. Step 630 is a decision step. At step 630 the UE determines if it is going to maintain the first UE ID or not. If yes, at step 640, the UE maintains both the first UE ID and the second UE ID. If not, at step 650, the UE drops the first UE ID and maintains the second UE ID.

The example methods 500 and 600 are intended for illustrative purposes. The steps that are identified in FIG. 5 as optional in the flow chart above may or may not be performed in a given implementation of the method. Other embodiments could involve performing the illustrated operations in any of various ways, performing fewer or additional operations, and/or varying the order in which operations are performed. Other variations could be or become apparent to a skilled person based on the present disclosure.

Figure 7:
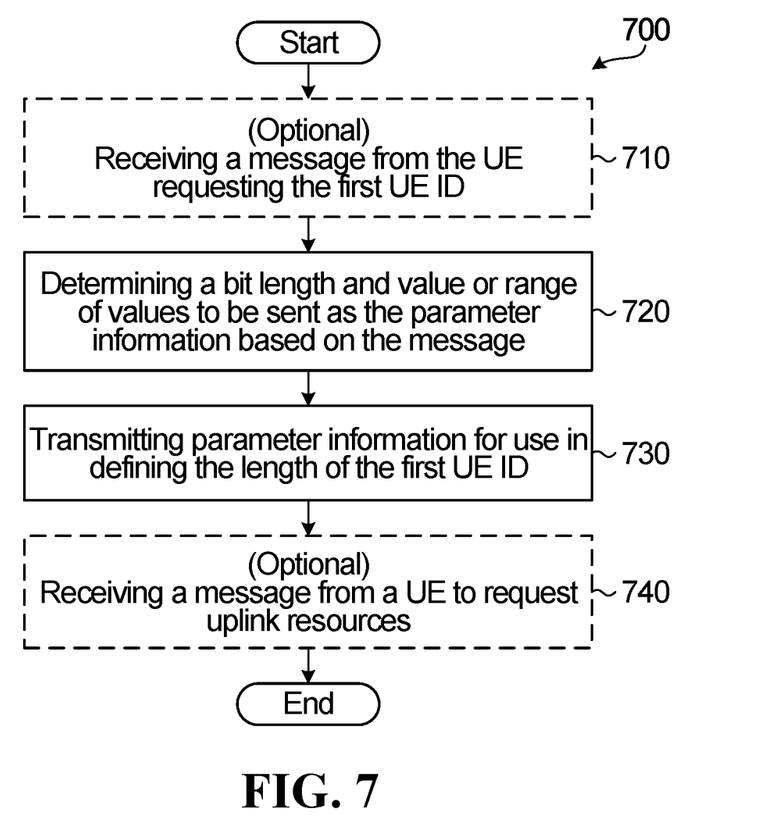
FIG. 7 is a flow diagram of an example method according to a further embodiment of the application.

FIG. 7 includes a flowchart 700 that illustrates an example method for configuring a UE ID from the perspective of the network.

Step 710, which is optional, involves the network receiving a message from the UE requesting the first UE ID. The step is optional in a similar manner indicated above with regard to step 510 in FIG. 5, because if the UE does not transmit the request, there is no request to be received by the network. Step 720 involves the network determining a bit length and a value, possibly from a range of values, to be sent as the parameter information based on the message. Step 730 involves the network transmitting parameter information for use in defining the length of the first UE ID. As described above, this could be broadcast by the network at regular intervals for use by UEs joining the network or in response to a request, as in optional step 710. In a further optional step, step 740 involves the network receiving a message from a UE to request uplink resources.

Figure 8:
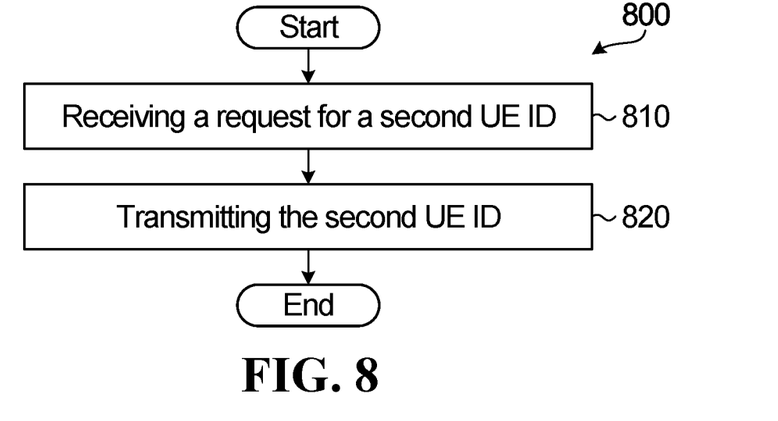
FIG. 8 is a flow diagram of an example method according to yet a further embodiment of the application.

FIG. 8 includes a flowchart 800 that illustrates additional steps that may be performed following step 740 of FIG. 7. Such steps may generally correspond to steps described above that are part of the RRC Configuration mechanism. Step 810 involves the network receiving a request for a second UE ID. The second UE ID may be for a different slice. At step 820, the network transmits the second UE ID.

Figure 9:
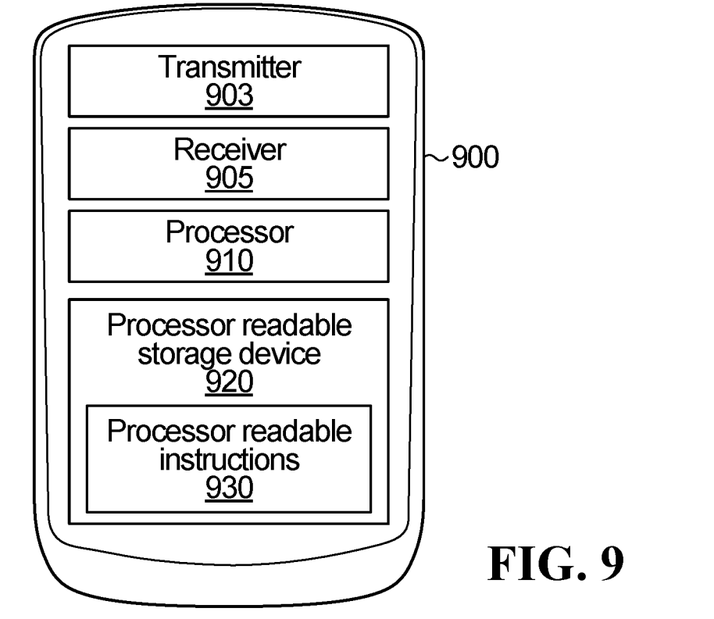
FIG. 9 is a block diagram of an example user equipment (UE) according to an aspect of the application.

FIG. 9 is a block diagram of an example apparatus 900 that operates according to aspects of the application as described herein. The example apparatus 900 may be a UE and thus may have various elements that would normally be a part of such an apparatus, such as a key pad, display screen, speaker, microphone, etc. The example apparatus 900 includes a transmitter 903, a receiver 905, processor 910 and a processor readable storage device 920. The processor readable storage device 920 has stored thereon processor executable instructions 930 that when executed by the processor cause the processor to perform a method consistent with the methods described above. The transmitter 903 and receiver 905 are coupled to the processor 910 and an antenna for over-the-air communication.

Figure 10:
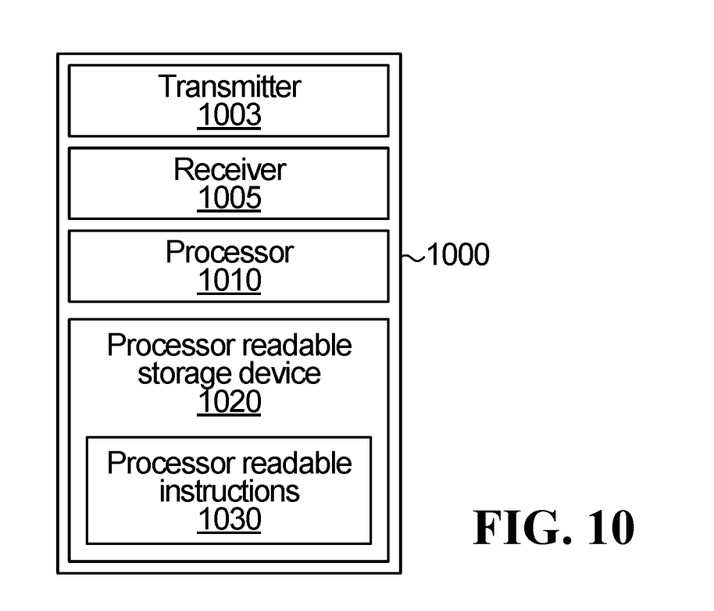
FIG. 10 is a block diagram of an example network server according to an aspect of the application.

FIG. 10 is a block diagram of an example network side apparatus 1000 that operates according to aspects of the application as described herein. Such a network side apparatus may include physical structure for performing other network side tasks and be located anywhere within the network that allows the device to operate accordingly. The example apparatus 1000 includes a transmitter 1003, a receiver 1005, a processor 1010 and a processor readable storage device 1020. The processor readable storage device 1020 has stored thereon processor executable instructions 1030 that when executed by the processor cause the processor to perform a method consistent with the methods described above. The transmitter 1003 and receiver 1005 are coupled to the processor 1010 and an antenna for over-the-air communication.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

We claim:

1. A method comprising:
    receiving, by a user equipment (UE), a first UE identifier (ID) for use when the UE is in a Radio Resource Control (RRC)_Connected active state;
    receiving, by the UE, a second UE ID for use when the UE is in a RRC_Inactive state, wherein a bit length of the first UE ID is shorter than a bit length of the second UE ID and the first UE ID and the second UE ID are each a different radio network temporary identifier (RNTI) that are independent of one another, and the RRC-Inactive state is different from the RRC_Connected active state and a RRC_Idle state;
    transitioning, by the UE, from the RRC_Connected active state to the RRC_Inactive state;
    performing, when the UE is in the RRC_Inactive state, grant free communications using the second UE ID, or using the second UE ID for uplink based measurements;
    transitioning, by the UE, from the RRC_Inactive state to the RRC_Connected active state; and
    maintaining, by UE, the second ID after transitioning from the RRC_Inactive state to the RRC_Connected active state.

2. The method of claim 1 further comprising maintaining the second UE ID after transitioning from the RRC_Connected active state to the RRC_Inactive state.

3. The method of claim 2 further comprising dropping the first UE ID and using the second UE ID.

4. The method of claim 1, receiving identifier parameter information defining the bit length of the first UE ID or the second UE ID.

5. The method of claim 4, wherein the identifier parameter information comprises at least one of:
    the bit length of the first or second UE ID;
    an index value associated with the bit length of the first or second UE ID; and
    a value to be used as the first UE ID or the second UE ID.

6. The method of claim 1 further comprising transmitting a message from the UE requesting the first UE ID or the second UE ID.

7. A user equipment (UE) comprising:
    a receiver;
    a transmitter; and
    a processor operatively connected to the receiver and the transmitter, the processor configured to:
        receive a first UE identifier (ID) for use when the UE is in a Radio Resource Control (RRC) Connected active state;
        receive a second UE ID for use when the UE is in a RRC_Inactive state, wherein a bit length of the first UE ID is shorter than a bit length of the second UE ID and the first UE ID and the second UE ID are each a different radio network temporary identifier (RNTI) that are independent of one another, and the RRC-Inactive state is different from the RRC_Connected active state and a RRC_Idle state;
        transition the UE from the RRC_Connected active state to the RRC_Inactive state;
        perform, when the UE is in the RRC_Inactive state, grant free communications using the second UE ID, or using the second UE ID for uplink based measurements;
        transition the UE from the RRC_Inactive state to the RRC_Connected active state; and
        maintain the second ID after transitioning from the RRC_Inactive state to the RRC_Connected active state.

8. The UE of claim 7, wherein the processor is further configured to maintain the second UE ID after transitioning from the RRC_Connected active state to the RRC_Inactive state.

9. The UE of claim 8, wherein the processor is further configured to drop the first UE ID and use the second UE ID.

10. The UE of claim 7, wherein the processor is further configured to receive identifier parameter information defining the length of the first UE ID or the second UE ID.

11. The UE of claim 10, wherein the identifier parameter information comprises at least one of:
    the bit length of the first or second UE ID;
    an index value associated with the bit length of the first or second UE ID; and
    a value to be used as the first UE ID or the second UE ID.

12. The UE of claim 7, wherein the processor is further configured to transmit a message requesting the first UE ID or the second UE ID.

13. A method comprising:
    transmitting, by a base station, a first user equipment (UE) identifier (ID) to a UE, for use when the UE is in a Radio Resource Control (RRC)_Connected active state;
    transmitting, by the base station, a second UE ID to the UE, for the UE to use for uplink based measurements or performing grant free communications when the UE is in a RRC_Inactive state, wherein a bit length of the first UE ID is shorter than a bit length of the second UE ID and the first UE ID and the second UE ID are each a different radio network temporary identifier (RNTI) that are independent of one another, and the RRC-Inactive state is different from the RRC_Connected active state and a RRC_Idle state;
    performing, by the base station, after the UE transitioning from RRC Active state to the RRC_Inactive state, grant free communications using the second UE ID, or using the second UE ID for uplink based measurements;
    maintaining, by the base station for the UE, the second ID after the UE transitioning from the RRC_Inactive state to the RRC_Connected active state.

14. A base station comprising:
    a receiver;
    a transmitter; and
    a processor operatively connected to the receiver and the transmitter, the processor configured to:
        transmit a first user equipment (UE) identifier (ID) to a UE, for use when the UE is in a Radio Resource Control (RRC)_Connected active state;
        transmit a second UE ID to the UE, for the UE to use for uplink based measurements or performing grant free communications when the UE is in a RRC_Inactive state, wherein a bit length of the first UE ID is shorter than a bit length of the second UE ID and the first UE ID and the second UE ID are each a different radio network temporary identifier (RNTI) that are independent of one another, and the RRC-Inactive state is different from the RRC_Connected active state and a RRC_Idle state;

perform, after the UE transitioning from RRC Active state to the RRC_Inactive state, grant free communications using the second UE ID, or using the second UE ID for uplink based measurements;

maintain, for the UE, the second ID after the UE transitioning from the RRC_Inactive state to the RRC_Connected active state.

15. The method of claim 1, wherein the first and second UE IDs are assigned by a network that the UE is communicating with.

16. The UE of claim 7, wherein the first and second UE IDs are assigned by a network that the UE is communicating with.

17. The method of claim 13, wherein the first and second UE IDs are assigned by a network that the base station is communicating with.

18. The base station of claim 14, wherein the first and second UE IDs are assigned by a network that the base station is communicating with.

19. The method of claim 13 further comprising maintaining the second UE ID after transitioning from the RRC_Connected active state to the RRC_Inactive state.

20. The base station of claim 14 wherein the processor further configured to maintaining the second UE ID after transitioning from the RRC_Connected active state to the RRC_Inactive state.

* * * * *